United States Patent
Grenet

(10) Patent No.: US 10,331,240 B2
(45) Date of Patent: Jun. 25, 2019

(54) AIR POINTER WITH IMPROVED USER EXPERIENCE

(71) Applicant: MOVEA, Grenoble (FR)

(72) Inventor: Pierre Grenet, rue Eugene Faure (FR)

(73) Assignee: Movea, Inc., Grenoble (FR)

( * ) Notice: Subject to any disclaimer, the term of this patent is extended or adjusted under 35 U.S.C. 154(b) by 373 days.

(21) Appl. No.: 15/025,474

(22) PCT Filed: Sep. 26, 2014

(86) PCT No.: PCT/EP2014/070619
§ 371 (c)(1),
(2) Date: Mar. 28, 2016

(87) PCT Pub. No.: WO2015/044345
PCT Pub. Date: Apr. 2, 2015

(65) Prior Publication Data
US 2016/0216775 A1  Jul. 28, 2016

(30) Foreign Application Priority Data

Sep. 27, 2013 (EP) ..................................... 13306334

(51) Int. Cl.
G06F 3/038 (2013.01)
G06F 3/0346 (2013.01)

(52) U.S. Cl.
CPC ............ *G06F 3/038* (2013.01); *G06F 3/0346* (2013.01)

(58) Field of Classification Search
CPC ................................ G06F 3/038; G06F 3/0346
See application file for complete search history.

(56) References Cited

U.S. PATENT DOCUMENTS

| | | | |
|---|---|---|---|
| 2010/0194687 A1* | 8/2010 | Corson ................. | G06F 3/0304 345/158 |
| 2011/0227825 A1* | 9/2011 | Liberty ................ | G06F 3/0383 345/158 |
| 2013/0176242 A1* | 7/2013 | Hashimi ................ | G06F 3/017 345/173 |

* cited by examiner

*Primary Examiner* — Carolyn R Edwards
(74) *Attorney, Agent, or Firm* — Bay Area Technology Law Group

(57) ABSTRACT

The invention discloses a device and a method to control an object on a surface using motion sensor measurements and relative and absolute pointing algorithms. Relative pointing is preferred at low speeds and absolute pointing is preferred at high speeds. Transition between the results of the two algorithms has to be smoothed, using a weighted combination of the two results. The weights may be made dependent over time or over speed of the device. Maximum and minimum values of different parameters may have to be set to avoid jumps or changes in direction which may affect the user's experience negatively.

The goal is that the user has consistent perceptions what he or she sees on the screen and the movements he or she imparts on the device, while still keeping the position of the object as close as possible to the position calculated by an absolute pointing algorithm.

18 Claims, 5 Drawing Sheets

AIR POINTER WITH IMPROVED USER EXPERIENCE

TECHNICAL BACKGROUND OF THE INVENTION

The present invention relates to the use of 3D pointers. These pointing devices are used for a variety of different purposes: control the functionalities of a TV set or a tablet, using or not a set top box, control a presentation on a desktop or a larger screen, play games, etc. A 3D pointer includes motion sensors which capture the motion imparted to the pointer by a user handling it. In most applications, the motion of the device in space is converted into the motion of a virtual object, often times a cursor, in a plane, generally a display. By controlling the object and moving it across the plane, the user is able to command the execution of specific functions, like e.g. selection of a program, control of an audio or a video stream, creation of drawings and graphics, etc. Depending on the use case, the precision of the control of the movement of the object will be more or less important. Generally speaking, high precision is needed when the movements of the pointer are slow (for example when drawing) and low precision is possible when the movements are quick (for example when selecting items). Therefore, the need for precision may vary continuously. If it were possible to use algorithms which provide high precision consistently over time, the best would of course be to use such an algorithm. However, the experimental evidence shows that all algorithms have pros and cons. For example, a relative pointing algorithm, where the position of the virtual object on the display is determined by adding displacements to the previous position based on the angular velocities of the pointer, may drift over time. Conversely, an absolute pointing algorithm, where the position of the virtual object on the display is derived from the attitude of the pointer in the frame of reference of the display, is more robust than the former over time, but is less accurate. It would therefore be desirable to be capable to use both algorithms, or a combination thereof, in order to take advantage of their positive characteristics. US patent application published under no US2011/227825 discusses the combination of pointing algorithms. According to this disclosure, different combinations of algorithms may be selected depending on the application. However, there is no hint therein that a combination of this type should be adapted dynamically and continuously to best match the variation of the requirement for e.g. precision.

SUMMARY OF THE INVENTION

It is an object of the present invention to overcome this limitation by providing an air pointer which can automatically and continuously switch between an algorithm of a first type, an algorithm of a second type, and a combination thereof, based on criteria being met so that, at any moment in time, the precision of the mapping between the movements of the pointer in space and the position of the virtual object on the display will be the best available.

To this effect, the invention discloses a device a device for controlling a virtual object on a surface comprising sensing: capabilities configured for producing an output formed from a timed series of measurements in relation to the device, said measurements selected from a group comprising attitude, position, first and second derivatives thereof; processing capabilities configured for producing, at least during a time window determined by at least one of a starting and an ending triggering event, from the output of the sensing capabilities, at least a first dataset and a second dataset, each one representative of at least one of orientation and position of the virtual object, first and second derivatives thereof; said processing capabilities being further configured to produce during said time window, from the at least first and second datasets, a third dataset representative of at least one of a position of a point of the virtual object and an orientation of said virtual object, said third dataset being calculated as a weighted combination of the at least first and second datasets, wherein the weight of the at least first and second datasets in said combination varies during the time window.

The invention also discloses a method for controlling with a device at least one of an orientation and position of a virtual object on a surface, first and second derivatives thereof, said method comprising: a step of producing an output formed from a timed series of measurements using sensing capabilities located in the device, said measurements selected from a group comprising attitude, position, first and second derivatives thereof; a step of as processing said output of the sensing capabilities to produce, during at least a time window determined by at least one of a starting and an ending triggering event, at least a first dataset and a second dataset, each one representative of at least one of orientation and position of the virtual object, first and second derivatives thereof, said method further comprising a step of producing, during said time window, from the output of the previous step, a third dataset representative of at least one of a position of a point of the virtual object and an orientation of said virtual object, said third dataset being calculated as a weighted combination of the at least first and second datasets, wherein the weight of the at least first and second datasets in said combination varies during the time window.

Advantageously, at least one of the starting and ending triggering event is determined based on one of a dynamicity parameter, a change of application running on the system, respectively the starting and ending of operation of the device, a button press, and a position of the virtual object.

Advantageously, the dynamicity parameter is calculated from at least one of the angular velocities of the device, the translational velocities of the device, the displacement velocity of the virtual object on the surface, and at least part of the first and second datasets.

Advantageously, the rate of change of at least one of the weights of the at least first and second datasets is limited to a maximum.

Advantageously, a ratio of a change in position d of a point of the virtual object, to a parameter representative of the dynamicity of the device, is limited to a set of values between a minimum and a maximum.

Advantageously, the weight of at least one of the at least first and second datasets is one of minimized and maximized while keeping the ratio between the minimum and the maximum of the set of values.

Advantageously one of the first and second datasets is composed of the coordinates of a point of the virtual object in a frame of reference of the surface, said coordinates being determined in relation to previous coordinates of the point by adding to said previous coordinates a displacement determined from measurements representative of at least one of angular velocities and translational velocities of the device.

Advantageously, one of the first and second datasets is composed of the coordinates of a point of the virtual object in a frame of reference of the surface, said coordinates being determined from measurements representative of at least one of the attitude and the position of the device.

Advantageously, said coordinates are calculated from the intersection with the surface of a vector representative of said attitude of the device.

Advantageously, said coordinates are calculated by applying a gain coefficient to the orientation angles of the device with respect to reference orientation angles, and adding the result of said calculation to the coordinates of a reference point on the surface.

Advantageously: a) the first dataset is composed of the coordinates of a point of the virtual object in a frame of reference of the surface, said coordinates being determined in relation to previous coordinates of the point by adding to said previous coordinates a displacement determined from measurements representative of at least one of angular velocities and translational velocities of the device; and b) the second dataset is composed of the coordinates of a point of the virtual object in a frame of reference of the surface, said coordinates being determined from measurements representative of at least one of the attitude and the position of the device; and c) the third dataset is a combination of the first dataset with weight w and the second dataset with weight (1−w).

Advantageously, a ratio of the change in position d based on the third dataset to the change in position $d_{rel}$ based on the first dataset is limited to a set of values between a minimum and a maximum.

Advantageously, the minimum and maximum depend on a dynamicity as parameter, said dynamicity parameter based on at least one of the angular velocities of the device, the translational velocities of the device, and the displacement velocity of the virtual object.

Advantageously, the weight w of the first dataset is chosen as the smallest value for which the ratio stays between the minimum and the maximum of the set of values.

Advantageously, the third dataset is recalculated from time to time by reducing the weight w of the first dataset to a preset value over a given period of time.

Advantageously, the third dataset is recalculated, one of, when a difference between a first value derived from at least part of the first dataset and a second value derived from at least part of the second dataset exceeds a preset threshold, when the virtual object is one of invisible or blurred, and at a given preset frequency.

The invention also discloses a computer program for executing a method for controlling with a device in space at least one of an orientation and position of a virtual object on a surface, first and second derivatives thereof, said program comprising a first module for producing an output formed from a timed series of measurements using sensing capabilities located in the device, said measurements from a group comprising attitude, position, first and second derivatives thereof; a second module for processing said output of the sensing capabilities to produce, during at least a time window determined by at least one of a starting and an ending triggering events, at least a first dataset and a second dataset, each one representative of at least one of orientation and position of the virtual object, first and second derivatives thereof; said computer program further comprising a third module for producing, during said time window, from the output of at least one of the first and second modules, a third dataset representative of at least one of a position of a point of the virtual object and an orientation of said virtual object, said third dataset being calculated as a weighted combination of the at least first and second datasets, wherein the weight of said first and second datasets in said combination varies during the time window.

The invention also brings enough smoothness in the transitions between different control modes of the object on the display, so that the user does not notice any change. Also, the speed or other parameters of the transition can be controlled to further reduce the possibility for a user to notice the transition in control modes. More generally, the invention allows an improvement of the robustness of a precise mapping algorithm against drift.

BRIEF DESCRIPTION OF THE DRAWINGS

The invention will be better understood and its various features and advantages will become apparent from the description of various embodiments and of the following appended figures.

DETAILED DESCRIPTION OF THE PREFERRED EMBODIMENTS

Figure 1:
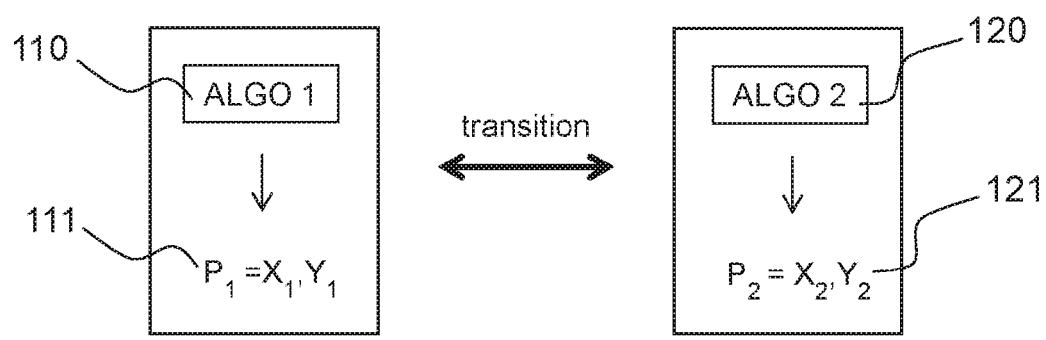
FIG. 1 illustrates how the position of a point on a surface may be calculated using two different algorithms.

FIG. 1 illustrates how the position of an object on a surface may be calculated using two difference algorithms.

A device may be used to control the movements of the object (position, orientation) on the surface. Devices used for these applications are air pointers or air mice equipped with motion sensors. In general these motion sensors are accelerometers and gyrometers, but magnetometers may also be included. The devices can also be in the form of a game interface like a WiiMote™. Smart phones can also be used, since they are now more and more often equipped with adequate motion sensors and the users only need to run the appropriate application to use the phone as a pointer. The basic operating principle of these devices is that the sensors determine motion parameters of the device in space and a processor then maps these motion parameters into position/motion data of an object on a surface, for example a cursor on a display.

The sensing device comprises a power supply and a channel of transmission of motion signals to a controller or a base station, which controls/shows the position of the object on the surface. Radiofrequency transmission can be effected with a Bluetooth waveform and protocol or with a Wi-Fi waveform and protocol (Standard 802.11g). Transmission can be performed by infra-red or by radiofrequency. The transmitted signals may be generated by a computation module either embedded in the device itself, or embedded into a base station or distributed between the device and the base station. The device comprises at least a computation module that deals with some processing of the sensors.

This computation module comprises a microprocessor, for example a DSP Texas instruments TMS320VC5509 for the most demanding applications in terms of computation time, or a 32-bit microcontroller with ARM core, for example one of those from the STR9 family, notably the STR9F12FAW32 from STM. The computation module also preferably comprises a flash memory necessary for storing the code to be executed, the permanent data which it requires, and a dynamic work memory. The computation module receives as input the outputs from the different sensors. On the one hand, angular velocity sensors have the function of measuring the rotations of the device in relation to two or three axes. These sensors are preferably gyrometers. It may be a two-axis gyrometer or a three-axis gyrometer. It is for example possible to use the gyrometers provided by Analog Devices with the reference ADXRS300. But any sensor capable of measuring angular rates or velocities is usable.

It is also possible to use magnetometers and use the measurements of their displacement with respect to the terrestrial magnetic field to determine the rotations with respect to the frame of reference of this field. It is for example possible to use the magnetometers with the reference HMC1001 or HMC1052 from the company Honeywell or KMZ41 from the company NXP. Preferably, one of the sensors is a three-axis accelerometer. Advantageously, the sensors are both produced by MEMS (Micro Electro Mechanical Systems) technology, optionally within one and the same circuit (for example reference accelerometer ADXL103 from Analog Devices, LIS302DL from ST MicroElectronics, reference gyrometer MLX90609 from Melixis, ADXRS300 from Analog Devices). The gyroscopes used may be is those of the Epson XV3500 brand.

The different sensors can be combined with a '3A3G3M' device, having three accelerometer (A) axes, three gyrometer (G) axes, and three magnetometer (M) axes. This type of sensor combination allows typical IMU (Inertial Measurement Unit) processing, which makes it possible to deliver a dynamic angle measurement. Such a device can deliver smoothed movement information, even for rapid movements or in the presence of ferrous metals that disturb the magnetic field.

The algorithms used to map motion of the device in space into motion of an object on a surface can be of one of two types:
  Absolute pointing, wherein the position of the object in the (X,Y) frame of reference of the surface is directly linked to the orientation/position of the pointing device. This means that every time the user holds the pointing device in a certain orientation/position, the orientation/position of the object is identical. The most straightforward example is a pointer that acts like a laser pointer, where the position of a point on the object coincides with the intersection of the pointing axes of the device with the surface. In addition, the orientation of the object on the surface may be deducted from the attitude of the device, for example by controlling the orientation by the roll angle of the device. Thus, in an absolute pointing algorithm the altitude of the pointing device is converted into the position (and possibly orientation) of the object on the surface.
  Relative pointing, wherein the displacement of the object in relation to a previous position is controlled by the motion of the air pointer. The best known example of relative pointing is the computer mouse. In an air pointer version of the mouse, the angular velocities (in yaw and pitch direction) are converted to cursor displacements $\Delta x$ and $\Delta y$. As in the case of the absolute pointing, the orientation of the object may also be controlled in a relative way from the motion of the pointer.

Relative pointing is more precise than absolute pointing because it is a simple conversion of motion of the pointer to displacement of the cursor.

Often, the relative pointing is largely based on gyrometer sensors which can have a high precision. However, because there is no absolute reference, the accumulation of small errors results in a drift of the position if the relative is pointing algorithm is used for a long time.

Absolute pointing, on the other hand, is less precise because the calculation of the exact attitude of the pointing device is mare complicated. In addition, more sensors are involved which may be less accurate, e.g. accelerometer and magnetometer. However, there is no accumulation of errors as in the relative algorithm, so the position does not drift over time.

Both pointing algorithms have their strong points and weaknesses, and it would therefore be desirable to be able to use relative pointing and absolute pointing alternatively, at moments when their respective qualities best suit the immediate requirements of the user.

As illustrated by FIG. 1, this would mean, for instance, using a relative pointing algorithm, 110 or ALGO1, when the movements of the pointer are slow, i.e. when a high precision is necessary, and using an absolute pointing algorithm, 120 or ALGO2, when precision is not mandatory, for instance when the movements of the pointer are quick.

It is therefore desirable to be able to use the two calculated positions P1, 111 and P2, 121 to determine the position of the object, depending on a factor characterising, for instance, the dynamicity of the movement. Dynamicity can be characterized in a number of ways, notably by calculating a norm of the angular velocity of the device or of the displacement velocity of the cursor.

Figure 2:
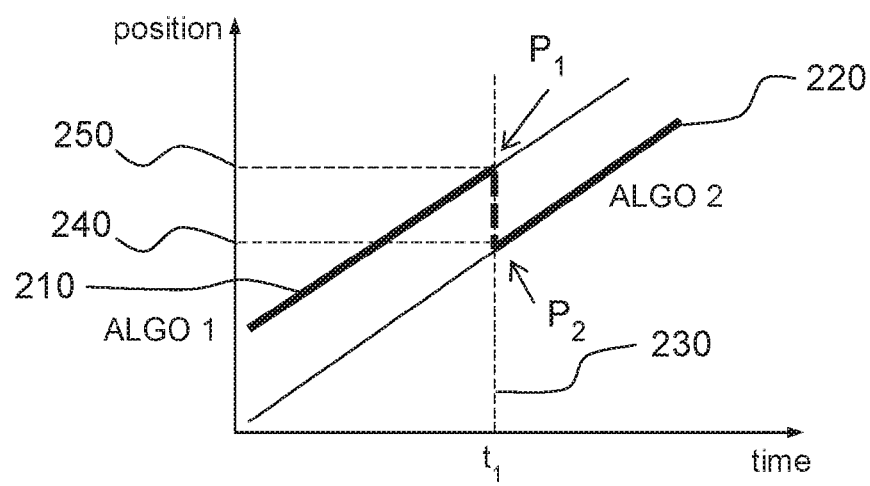
FIG. 2 illustrates a problem in a transition between two different algorithms.

FIG. 2 illustrates a problem in a transition between two different algorithms. A drawback of the use of two different algorithms is that if at the time of transitioning from ALGO1, 210, to ALGO2, 220, the calculated positions P1 and P2 are not identical, the position of the object on the surface would abruptly change from P1 to P2.

This is illustrated by the two different ordinates 240 and 250 during the transition between the algorithms at time t1, 230, on the graph plotting one coordinate of the point against time.

When the two values 240 and 250 are very different the object would make a jump at t1 which is not acceptable from a user's experience perspective and has to be corrected.

Figure 3:
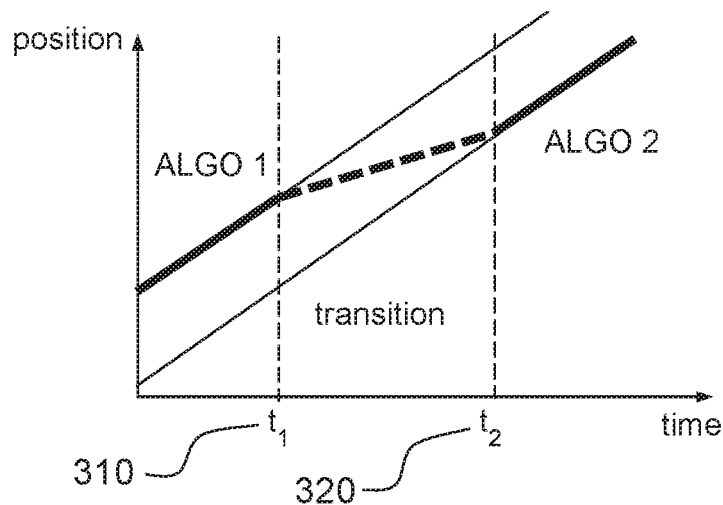
FIG. 3 represents a transition between two algorithms which is smoothed over time according to a number of embodiments of the invention.

FIG. 3 represents a transition between two algorithms which is smoothed over time according to a number of embodiments of the invention.

To avoid the problem mentioned in relation to FIG. 2 and to cover up any differences in the position, the switch between ALGO1 and ALGO2 should be a smooth transition over a certain time period. This means that the actual cursor position on the screen should be a combination of position P1 with a weight $w_1$ and position P2 with a weight $w_2$:

$$P = w_1 \cdot P_1 + w_2 \cdot P_2 \quad [1]$$

with $$w_1 + w_2 = 1.$$

The weights $w_1$ and $w_2$ will vary during the transition time window, starting with $w_1=1$ and $w_2=0$ and ending with $w_1=0$ and $w_2=1$. FIG. 3 shows an example of a transition between $t_1$, 310 and $t_2$, 320 where a linear combination of the two positions is used. A higher order transition can be used for an even smoother transition. In this example, for $t \leq t_1$ we have $w_1=1$ and $w_2=0$, and for $t \geq t_2$ we have $w_1=0$ and $w_2=1$.

It is possible to calculate the positions using both algorithms all the time, but to give ALGO2 a weight $w_2=0$ when only ALGO1 is needed for $t \leq t_1$ and to give ALGO1 a weight $w_1=0$ when only ALGO2 is needed for $t \geq t_2$. However, to avoid unnecessary calculation and save processing power, we can also only calculate the positions using the algorithms that are actually needed, i.e. both algorithms are used during the transition, but only ALGO1 is executed for $t \leq t_1$ and only ALGO2 is executed for $t \geq t_2$.

Figure 4:
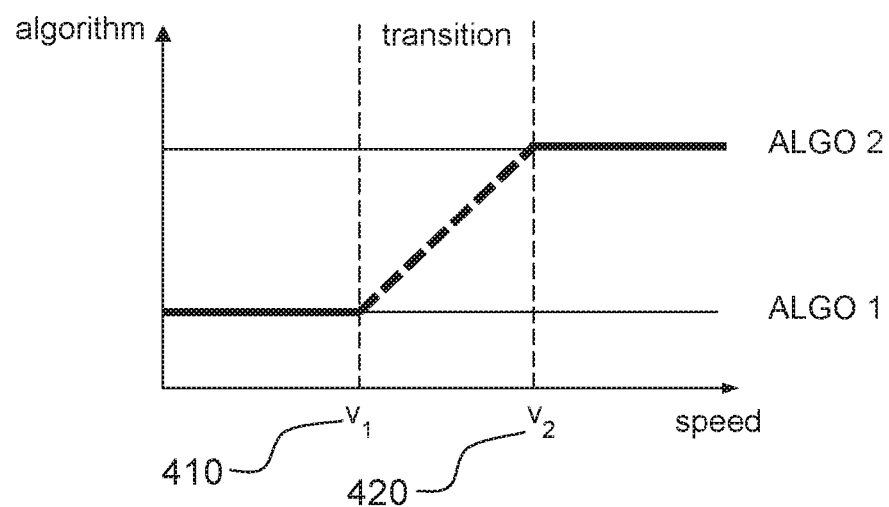
FIG. 4 represents a transition between two algorithms which is controlled by the speed of the pointer according to a number of embodiments of the invention.

FIG. 4 represents a transition between two algorithms which is controlled by the speed of the pointer according to a number of embodiments of the invention.

The decision to switch between algorithms and the starting or ending of the transition may depend on several different types of triggers, such as e.g. dynamicity, screen position, time, or application management. As discussed above, the use of relative and absolute pointing algorithms may depends on the dynamicity of the movement of the device, where relative pointing algorithms are preferred at low speeds (low dynamicity), and absolute pointing algorithms are best suited for high speeds (high dynamicity). This means that the transition between the algorithms should be governed by the is speed. The dynamicity or speed can be derived from the cursor displacements or change in the position calculated by the algorithms.

Alternatively, the speed can be directly derived from the angular or lateral movements of the device using the different sensors, such as the gyrometer or accelerometer. FIG. 4 shows an example of such a combination, where ALGO1 is a relative pointing algorithm and ALGO2 is an absolute pointing algorithm, and the speeds $v_1$, 410 and $v_2$, 420 are used as triggers for the starting and ending of the transition.

The weights $w_1$ and $w_2$ therefore depend on speed v:

$$P = w_1(v) \cdot P_1 + w_2(v) \cdot P_2 \quad [2]$$

The position calculated by the absolute pointing algorithm at time t is referred to as $P_{abs}(t)$. The relative pointing algorithm does not produce a position, but rather a change in position referred to as $\Delta P_{rel}(t)$. The position based on the relative position algorithm is a sum of the previously calculated position at time $t-1$ and this change in position:

$$P_{rel}(t) = P(t-1) + \Delta P_{rel}(t) \quad [3]$$

The combination of the relative and absolute pointing algorithms yields:

$$P(t) = w_{rel}(v) \cdot P_{rel} + w_{abs}(v) \cdot P_{abs}(t) \quad [4]$$

Or $$P(t) = w_{rel}(v) \cdot (P(t-1) + \Delta P_{rel}(t)) + w_{abs}(v) \cdot P_{abs}(t) \quad [5]$$

As discussed in relation to FIG. 3, both algorithms might be active all the time since their contribution to the position is governed by the weights.

Alternatively, ALGO1 might be inactive for speeds above $v_2$ and ALGO2 might be inactive for speeds below $v_1$.

Figure 5:
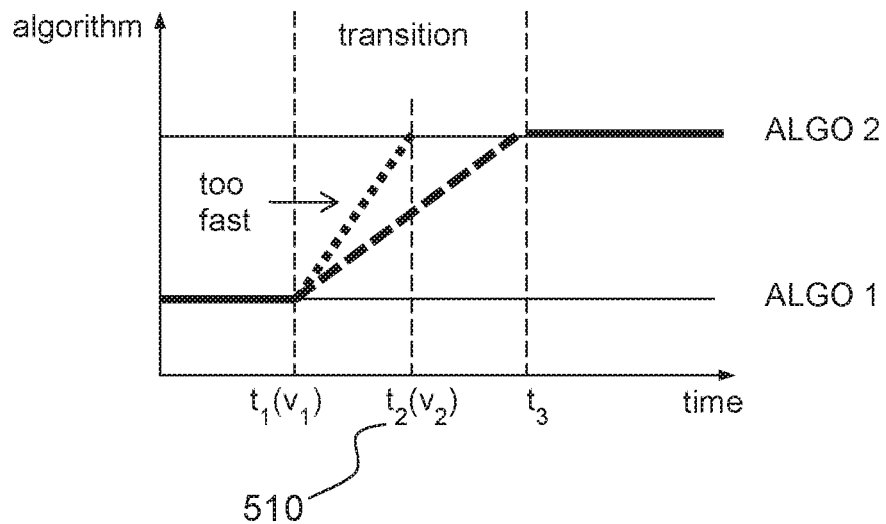
FIG. 5 illustrates a problem in a transition between two algorithms when controlled by the speed of the pointer.

FIG. 5 illustrates a problem in a transition between two algorithms when controlled by the speed of the pointer.

The duration of the transition depends on the time it takes the user to change the speed from $v_1$ to $v_2$. For large accelerations or decelerations the transition will be quick. As discussed in relation to FIG. 2, if there is a difference in the position calculated by the two algorithms, a transition that is too fast might be perceived by the user as a jump in the cursor position.

The example of FIG. 5 shows that the transition starts at $t_1$ when $v_1$ is reached, but because of the large acceleration $v_2$ is already reached at $t_2$, 510, which would result in a very short transition that might be visible to the user, in order to avoid this problem, the transition should have a certain duration and a maximum transition rate, so that even if $v_2$ is reached rapidly at $t_2$, the transition is not completed before $t_3$.

One way to avoid transitions which are too brisk is to set a maximum value to the temporal variation of the weights $w_1$ and $w_2$:

$$\frac{dw_i}{dt} \leq \frac{dw^{max}}{dt} \quad [6]$$

The maximum variation of the weight might depend on the difference in the two positions calculated by ALGO1 and ALGO2. If this difference is small, the distance covered during the transition is small, and thus dw/dt can be high. As a variant, a low-pass lifter (e.g. Butterworth filter) can be applied to the weights to avoid too fast a transition.

Figure 6:
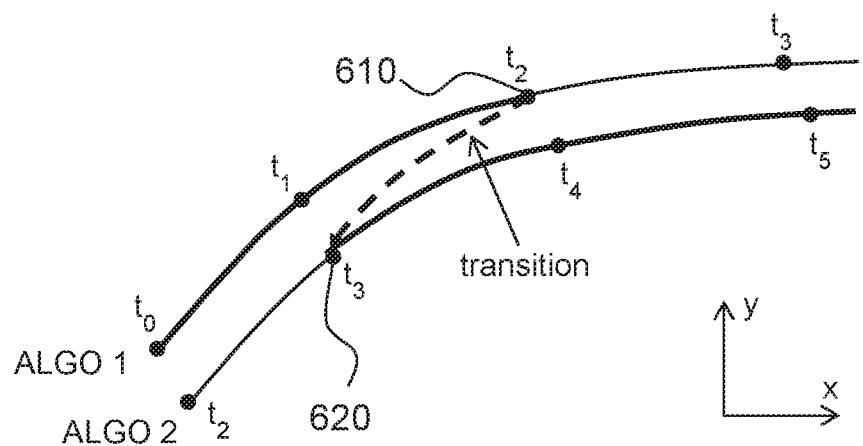
FIG. 6 illustrates two trajectories of the position over time calculated by two algorithms.

FIG. 6 illustrates two trajectories of the position over time calculated by two algorithms.

The direction of the transition (ALGO1 to ALGO2 or ALGO2 to ALGO1) may also influence the likelihood that a transition is smooth. For example, if a user uses a relative algorithm for a substantial period of time, the calculated position may drift from the actual position. Therefore, when making a transition to an absolute algorithm, care must be taken during the transition to smoothly correct for the acquired drift, as described below. On the other hand, when making a transition from an absolute to a relative algorithm, no such drift correction is needed, and thus the transition can be fast (or instantaneous).

The direction of movement during the transition should be fluid, meaning there should not be an abrupt change in direction. FIG. 6 displays the position of an object on a screen determined by ALGO1 and ALGO2 at different times ($t_0$-$t_5$). For both algorithms dx/dt and dy/dt are positive in this case, the position from ALGO2 is lagging behind. During the transition, taking place between times $t_2$, 610 and $t_3$, 620 the direction of movement of the cursor is reversed due to the fact that ALGO2 is lagging behind.

In order to avoid sudden jumps or reversal of the direction during a transition is from a relative method to an absolute method we can use the derivative of the position dP/dt. Consider the position P:

$$P = w \cdot P_{rel} + (1-w) \cdot P_{abs} \quad [7]$$

and its derivative $$\frac{dP}{dt} = w \cdot \frac{dP_{rel}}{dt} + (1-w) \cdot \frac{dP_{abs}}{dt} \quad [8a]$$

Using the notation d for the derivative dP/dt, the equation can be rewritten as:

$$d = w \cdot d_{rel} + (1-w) \cdot d_{abs} \quad [8b]$$

The direction in which the user moves the cursor by moving the device can be represented by $d_{rel}$, while the movement of the cursor on the screen is represented by d. To ensure a smooth transition, these two derivatives should not differ too much, so that the user has consistent perceptions of what he or she sees on the screen (d) and the movements he or she imparts on the device ($d_{rel}$). We can impose, for example, that the ratio of these derivatives stays within preset limits:

$$1-\beta < \frac{d}{d_{rel}} < 1+\beta \quad [9a]$$

Here we used $\beta$ for the upper and lower limit, but they do not need to be identical. By way of example only, we can set the parameter to $\beta=0.2$.

Parameter $\beta$ may also depend on the speedy where for low speeds we have a small $\beta$ and for high speeds we use a larger $\beta$, thus allowing for a larger difference between $d_{rel}$ and d. The weight w is adapted to meet this condition and to control the transition in a way to guarantee no abrupt changes in direction occur. Combining eq. 8b and eq. 9a gives:

$$1-\beta < w \cdot \left(1 - \frac{d_{abs}}{d_{rel}}\right) + \frac{d_{abs}}{d_{rel}} < 1+\beta \quad [9b]$$

This means that once the ratio $d_{abs}/d_{rel}$ has been determined, the allowed range of the weight w in order to stay within the limits set by $\beta$ can be derived. The derivative $d_{rel}$ may be determined directly from the gyrometers by applying the appropriate gain, and $d_{abs}$ can be calculated using the position from the absolute algorithm at time t and the previous (combined) position P at time (t−1):

$$d_{abs} = \frac{P_{abs}(t) - P(t-1)}{\Delta t} \quad [10]$$

Using the ratio of derivatives $d/d_{rel}$ as introduced in eq. 9a, we can also approach the problem of having smooth transitions between high and low speeds in a different way. In principle what we want is that the position is always close to the position calculated by the absolute algorithm (no drift), and that the movement of the cursor corresponds to the movements of the device imparted to it by the user. This means that we would like to have the weight w as small as possible (see eq. [7]) while still maintaining the limiting conditions applying to the ratio of the derivative (see eq. [9a] and [9b]).

In this method we continuously vary the contributions of the absolute and relative algorithms end start by determining the derivatives $d_{rel}$ and $d_{abs}$ at each point in time, and calculating the ratio $d_{abs}/d_{rel}$ as discussed above. Next, we insert the determined ratio $d_{abs}/d_{rel}$ into eq. [9b] and find the smallest weight w that will meet the condition set by $\beta$. This maximizes the contribution of the absolute algorithm as required. Parameter $\beta$ can be set as a fixed value or may depend on the speed, for example, a smaller $\beta$ at low speeds for more accuracy. In the latter case $\beta$ may be determined using $d_{rel}$ before solving the condition. The obtained weight w can then be used in eq. (7) to determine the actual position P(t) that is as close as possible to the absolute position $P_{abs}(t)$ while still meeting the derivatives condition as imposed by eq. (9a) so that the change in position on the screen is consistent with the movements of the user.

The calculations can also be performed independently for the different axes x and y. This means that the derivatives $d_{rel}$ and $d_{abs}$ can be determined for each axis, resulting in different weights for each axis. Therefore, the contributions of the relative and absolute algorithms can be different for the different axes.

The above described mode of a continuous variation of and transition between the two algorithms can be controlled by different types of triggers. For example, certain applications might require such a mode and the start and end triggers can be given by the starting and ending of the application respectively. The user might also (manually) give the start and end triggers for this mode, for example by a button press. Alternatively, the start and end triggers might be given by the user starting and stopping to use the remote.

Figure 7C:
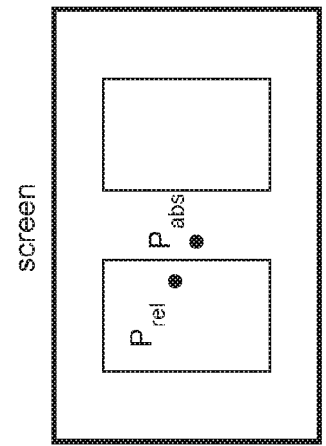
FIGS. 7*a*, 7*b* and 7*c* illustrate how a position of an object on a screen determined by a first algorithm can be modified by a calculation determined by a second algorithm according to some embodiments of the invention.
Figure 7A:
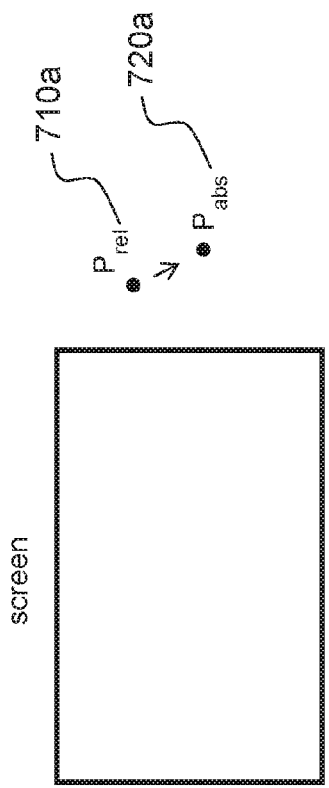
Figure 7B:
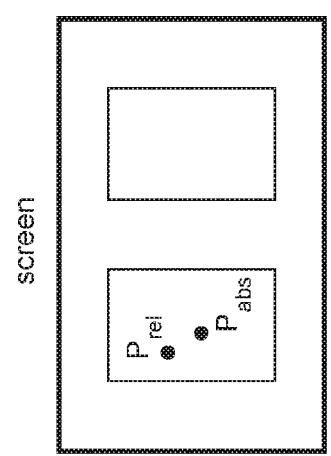

FIGS. 7a, 7b and 7c illustrate how a position of an object on a screen determined by a first algorithm can be modified by a calculation determined by a second algorithm according to some embodiments of the invention.

So far, we have described solutions meant to ensure that no abrupt transitions were perceived by the user. However, it can happen that, the user points the remote outside the boundaries of the screen. In this case, the cursor will not be displayed.

FIG. 7a represents the screen and the positions calculated by the relative pointing algorithm $P_{rel}$, 710a and the absolute pointing algorithm $P_{abs}$, 720a. The fact that the cursor is not visible can be used to correct for any error that might have been accumulated during execution of the relative algorithm, and realign the relative position with the absolute position. This means that $P_{rel}$ is set equal to $P_{abs}$. This realignment should be done when the virtual cursor is a certain distance from the screen border so as to avoid jumps in the cursor position when the user only briefly exits the screen.

The realignment between the different algorithms can be performed in any situation where the cursor is not visible or is blurred. This means that in a graphical interface where instead of a cursor icons are highlighted when the user moves the virtual cursor across the icon, the realignment principle can be applied when both positions (relative and absolutes are within for outside) the icon area (as illustrated on FIG. 7b). In any case realignment should be avoided when a change in position due to the transition would cause to enter or exit an area which is highlighted (as Illustrated on FIG. 7c).

In the examples above, the transition was triggered by a change of speed. Similar transitions can also be used to correct certain algorithms for accumulated errors. For example, if the relative algorithm is used for longer periods, the drift might continuously increase the difference with the absolute to algorithms. In order to avoid that the difference gets too large, the system can monitor the difference between the algorithms and perform a correction/transition to realign, for example, the relative position with the absolute position, without it being noticed by the user.

In the description above we have not discussed how to execute the absolute pointing because the functioning of said algorithm is not the gist of the invention; the invention will work independently of the method of calculation of the absolute position. For example, we can use a spherical pseudo absolute algorithm where the yaw and pitch of the device are directly converted to the x and y position after the application of a gain.

Figure 8B:
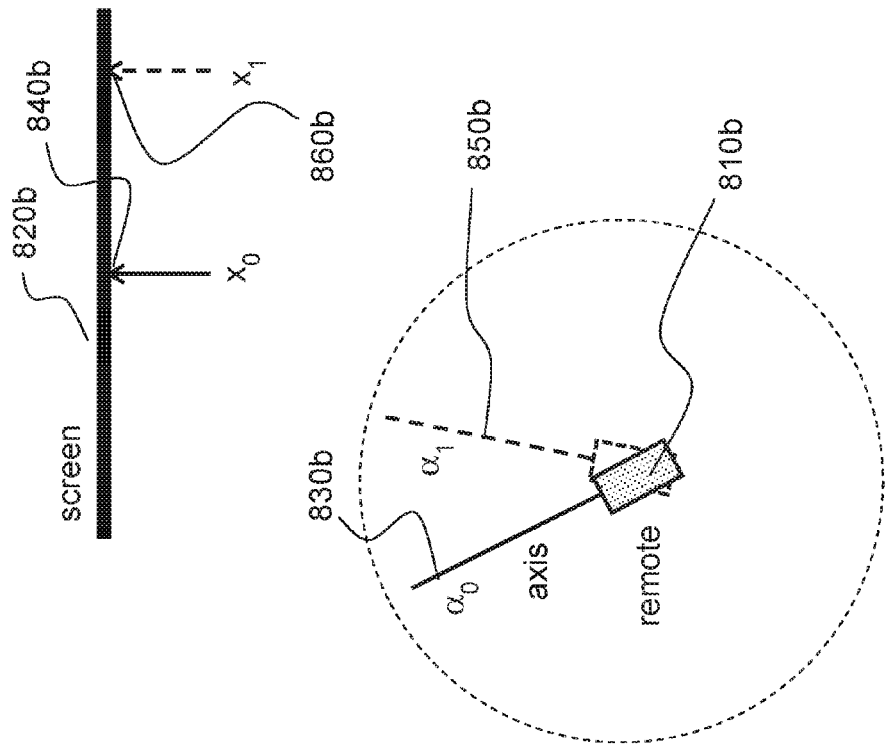
FIGS. 8*a* and 8*b* illustrate embodiments of the invention wherein a spherical pseudo-absolute pointing algorithm is used.
Figure 8A:
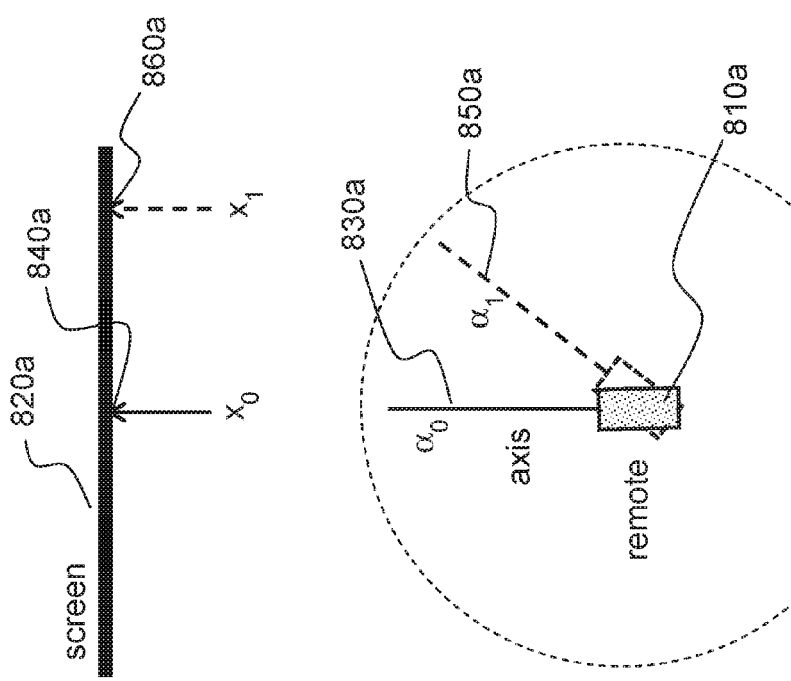

FIGS. 8a and 8b illustrate embodiments of the invention wherein a spherical pseudo-absolute pointing algorithm is used.

FIG. 8a shows the remote 810a and the screen 820a in one dimension, where the sphere is represented by the circle. At the initial position, the remote is at angle $\alpha_0$, 830a, which corresponds to position $x_0$, 840a, on the screen. When the remote is rotated to angle $\alpha_1$, 850a, the position on the screen becomes $x_1$, 860a. Note that the remote does not necessarily act as a laser pointer since the direction $\alpha_1$ does not point directly at position $x_1$. The position depends on the gain g according to:

$$x_1 - x_0 = g^*(\alpha_1 - \alpha_0) \quad [11]$$

As is shown in FIG. 8b, in the initial position the remote 810b does not have to be aligned with the position of the screen 820b. The pointing is absolute in the sense that, every time the user has the remote in orientation $\alpha_0$, 830b, or $\alpha_1$, 850b, the position on the screen is $x_0$, 840b, or $x_1$, 860b, respectively.

Because the pointing is not absolute like a laser pointer, we refer to this method as pseudo absolute.

The relation between the initial or reference orientation $\alpha_0$ and the initial or reference position $x_0$ can be set by the system. For example, the orientation as of the device when it is started refers to the position $x_0$, e.g. the center or a corner of the screen. Alternatively, the relation can be set by the user, for example by pressing a button on the remote, indicating that the orientation $\alpha_0$ at the moment of the button press refers to position $x_0$.

The absolute position can be calculated using a 9-axes device comprising accelerometers, gyrometers and magnetometers (AGM), where the magnetometer axes are used for an absolute yaw reference. However, a system with only accelerometers and gyrometers (AG) with limited perturbation (drift and noise) will also work fine. The accelerometers may be used for roll compensation and the conversion of the movements from the reference frame of the device to the reference frame of the display.

In the description above, we have focused on the fact that the type of algorithm depends on the speed of the cursor/pointing device. It might also be possible that, different applications require different algorithms. Therefore, when changing applications, and thus changing algorithms, a smooth transition is also preferred.

The examples disclosed in this specification are only illustrative of some embodiments of the invention. They do not in any manner limit the scope of said invention which is defined by the appended claims.

The invention claimed is:

1. A device for controlling a virtual object on a surface comprising:
   inertial sensing capabilities configured for producing an output formed from a timed series of measurements in relation to the device, said measurements selected from a group comprising altitude, position, first and second derivatives thereof;
   processing capabilities configured for producing, at least, during a time window determined by at least one of a starting and an ending triggering event, from the output of the sensing capabilities, at least a first inertial dataset and a second inertial dataset, each one corresponding to the time window and representative of at least one of orientation and position of the virtual object, first and second derivatives thereof; said processing capabilities being further configured to
   produce during said time window, from the at least the first and second datasets, a third dataset corresponding to the time window and representative of at least one of a position of a point of the virtual object and an orientation of said virtual object, said third dataset being calculated as a weighted combination of the at least first and second datasets, wherein a weight of the at least first and second datasets in said combination varies during the time window such that the weight of the first dataset transitions from a maximum at a beginning of the time window to a minimum at an end of the time window and the weight of the second dataset transitions from a minimum at the beginning of the time window to a maximum at the end of the time window.

2. A method for controlling with a device at least one of an orientation and position of a virtual object on a surface, first and second derivatives thereof, said method comprising:
   a step of producing an output formed from a timed series of measurements using inertial sensing capabilities located in the device, said measurements selected from a group comprising attitude, position, first and second derivatives thereof;
   a step of processing said output of the sensing capabilities to produce, during at least a time window determined by at least one of a starting and an ending triggering event, at least a first inertial dataset and a second inertial dataset, each one corresponding to the time window and representative of at least one of orientation and position of the virtual object, first and second derivatives thereof; said method further comprising a step of:
   producing, during said time window, from the at least first and second datasets, a third dataset corresponding to the time window and representative of at least one of a position of a point of the virtual object and an orientation of said virtual object, said third dataset being calculated as a weighted combination of the at least first and second datasets, wherein a weight of the at least first and second datasets in said combination varies during the time window such that the weight of the first dataset transitions from a maximum at a beginning of the time window to a minimum at an end of s the time window and the weight of the second dataset transitions from a minimum at the beginning of the time window to a maximum at the end of the time window.

3. The method of claim 2 wherein at least one of the starting and ending triggering event is determined based on one of a dynamicity parameter, a to change of application running on the system, respectively the starting and ending of operation of the device, a button press, and a position of the virtual object.

4. The method of claim 3, wherein the dynamicity parameter is calculated is from at least one of the angular velocities of the device, the transitional velocities of the device, the displacement velocity of the virtual object on the surface, and at least part of the first and second datasets.

5. The method of claim 2, wherein the rate of change of at least one of the weights of the at least first and second datasets is limited to a maximum.

6. The method of claim 2, wherein a ratio of a change in position d of a point of the virtual object, to a parameter representative of the dynamicity of the device, is limited to a set of values between a minimum and a maximum.

7. The method of claim 6, wherein the weight of at least one of the at least first and second datasets is one of minimized and maximized while keeping the ratio between the minimum and the maximum of the set of values.

8. The method of claim 2, wherein one of the first and second datasets is composed of the coordinates of a point of the virtual object in a frame of reference of the surface, said coordinates being determined in relation to previous coordinates of the point by adding to said previous coordinates a displacement determined from measurements representative of at least one of angular velocities and translational velocities of the device.

9. The method of claim 2, wherein one of the first and to second datasets is composed of the coordinates of a point of the virtual object in a frame of reference of the surface, said coordinates being determined from measurements representative of at least one of the attitude and the position of the device.

10. The method of claim 9, wherein said coordinates are calculated from the intersection with the surface of a vector representative of said attitude of the device.

11. The method of claim 9, wherein said coordinates are calculated by applying a gain coefficient to the orientation angles of the device with respect to reference orientation angles, and adding the result of said calculation to the coordinates of a reference point on the surface.

12. The method of claim 2, wherein:
   a) the first dataset is composed of the coordinates of a point of the virtual object in a frame of reference of the surface, said coordinates being determined in relation to previous coordinates of the point by adding to said previous coordinates a displacement determined from measurements representative of at least one of angular velocities and translational velocities of the device; and
   b) the second dataset is composed of the coordinates of a point of the virtual object in a frame of reference of the surface; said coordinates being determined from measurements representative of at least one of the attitude and the position of the device; and
   c) the third dataset is a combination of the first dataset with weight w and the second dataset with weight (1−w).

13. The method of claim 12, wherein a ratio of the change in position d based on the third dataset, to the change in position $d_{rel}$ based on the first dataset, is limited to a set of values between a minimum and a maximum.

14. The method of claim 13, wherein the minimum and maximum depend on a dynamicity parameter, said dynamicity parameter based on at least one of the angular velocities of the device, the translational velocities of the device, and the displacement velocity of the virtual object.

15. The method of claim 13, wherein the weight w of the first dataset is chosen as the smallest value for which the ratio stays between the minimum and the maximum of the set of values.

16. The method of claim 12, wherein the third dataset is recalculated from time to time by reducing the weight w of the first dataset to a preset value over a given period of time.

17. The method of claim 16, wherein the third dataset is recalculated, one of, when a difference between a first value derived from at least part of the first dataset and a second value derived from at least part of the second dataset exceeds a preset threshold, when the virtual object is one of invisible or blurred, and at a given preset frequency.

18. A non-transitory storage medium having a computer program for executing a method for controlling with a device in space at least one of an orientation and position of a virtual object on a surface, first and second derivatives thereof, said program comprising:
   a first module for producing an output formed from a timed series of measurements using inertial sensing capabilities located in the device, said measurements from a group comprising attitude, position, first and second derivatives thereof;
   a second module for processing said output of the sensing capabilities to produce, during at least a time window determined by at least one of a starting and an ending triggering events, at least a first inertial dataset and a second inertial dataset, each one corresponding to the time window and representative of at least one of orientation and position of the virtual object, first and second derivatives thereof; said computer program further comprising:
   a third module for producing, during said time window, from the at least first and second datasets, a third dataset corresponding to the time window and representative of at least one of a position of a point of the virtual object and an orientation of said virtual object, said third dataset being calculated as a weighted combination of the at least first and second datasets, wherein a weight of said first and second datasets in said combination varies during the time window such that the weight of the first dataset transitions from a maximum at a beginning of the time window to a minimum at an end of s the time window and the weight of the second dataset transitions from a minimum at the beginning of the time window to a maximum at the end of the time window.

* * * * *